July 21, 1964 A. CANDELISE 3,141,448
PRESSURIZED FLUID DISTRIBUTION AND TIMING SYSTEM
Original Filed March 4, 1960
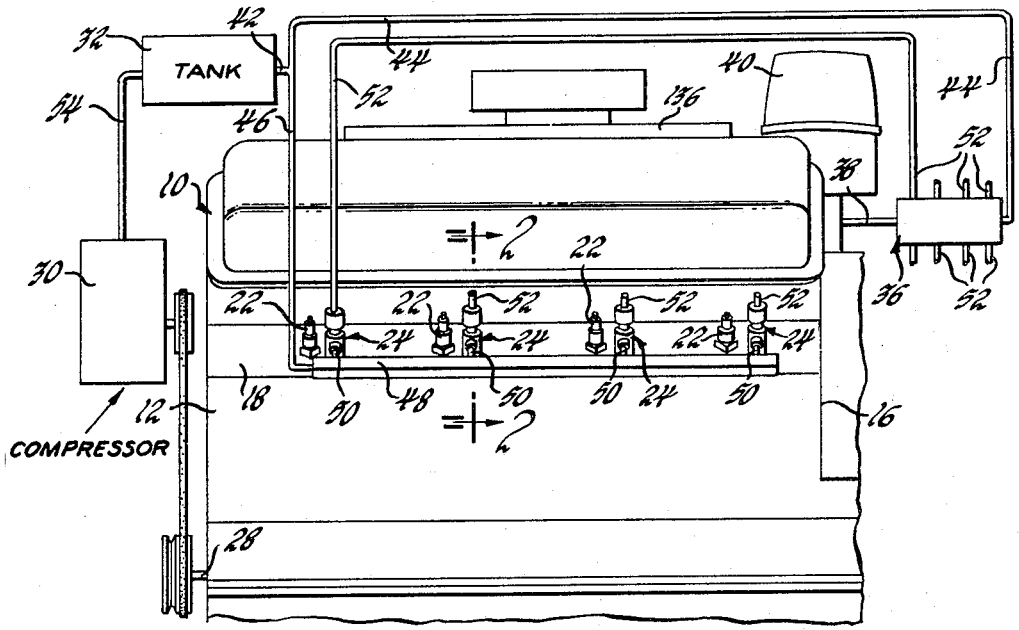
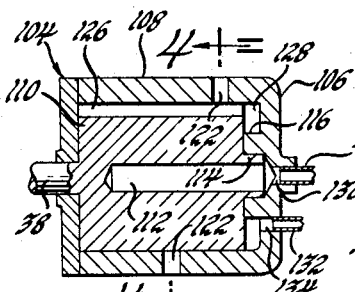
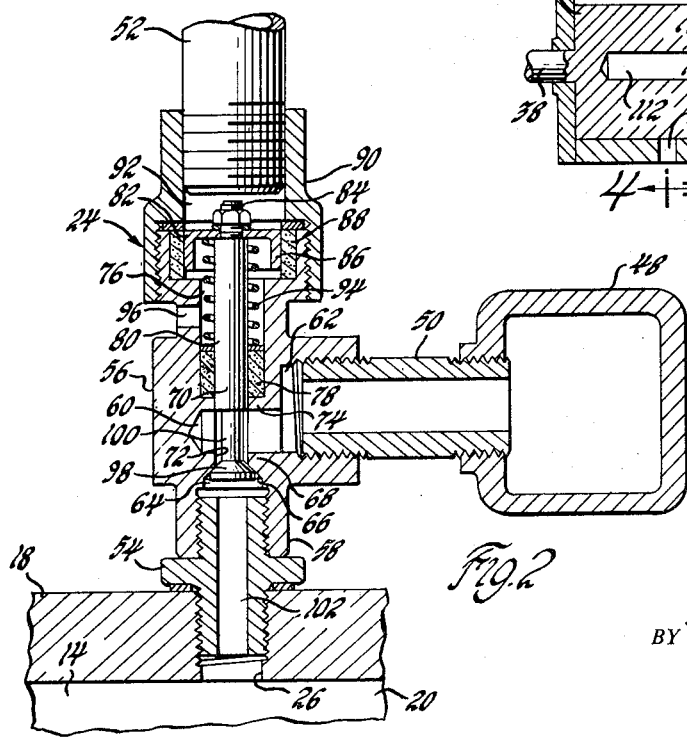
INVENTOR.
Alfred Candelise
BY
ATTORNEY 3,141,448
PRESSURIZED FLUID DISTRIBUTION AND
TIMING SYSTEM
Alfred Candelise, Flint, Mich., assignor to General
Motors Corporation, Detroit, Mich., a corporation of
Delaware
Original application Mar. 4, 1960, Ser. No. 12,855, now
Patent No. 3,019,777, dated Feb. 6, 1962. Divided
and this application May 24, 1961, Ser. No. 112,448
3 Claims. (Cl. 123—26)

This is a division of my co-pending application Serial No. 12,855 entitled "Air Injection System for an Internal Combustion Engine" filed March 4, 1960, now Patent No. 3,019,777.

The invention relates to a system for distributing and timing the delivery of pressurized fluid to a chamber in timed operation with a cycle of operation being carried out within the chamber. As a preferred embodiment, it particularly relates to such a system for injecting compressed air into the combustion chambers of an internal combustion engine during the engine expansion strokes in order to more completely burn the fuel contained therein. Use of structure embodying the invention may also be found in other fluid pressure systems.

It has been found that one of the major sources of atmospheric contamination is the unburned fuel passing through the combustion chambers of an engine and exhausted therefrom, particularly at idle and low speed operating conditions. By injecting compressed air during the latter portion of the combustion step, the otherwise unburned hydrocarbons will be provided with sufficient oxygen to burn while still in the engine combustion chambers. This will result in substantially complete elimination of the carbon monoxide content of the exhaust gases as well as other unburned hydrocarbons. It also increases engine power and efficiency.

A generally similar system is disclosed in my co-pending application Serial No. 12,857, filed March 4, 1960, now Patent No. 3,073,289, in which the air is injected during the latter portion of the engine expansion strokes through the engine spark plug openings, the air being timed and distributed by a valve mechanism operating in timed relation to the engine.

The invention which is the subject of this application provides different means for timing and distributing the air to the engine combustion chambers.

The invention as embodied in such a system uses an air manifold to which compressed air is delivered from a suitable compressed air source and from which air is supplied to separate air introducing means for each combustion chamber. The air in the manifold provides the air which is to be injected into the combustion chambers. A separate air circuit is provided which times the injection of the air from the manifold by actuating a poppet valve which permits air to flow from the manifold to the various combustion chambers in the proper timed relation.

A rotary air distribution and timing valve assembly of somewhat different construction and operation from that disclosed in my co-pending application, referred to above, is provided. When using the dual fluid pressure system, it has been found that in some instances the poppet valve will not close immediately when the actuating compressed air is cut off. The modified timing and distribution valve is provided with a passage which communicates with an engine intake manifold so that each actuating air conduit is alternately connected to pressurized air from the compressed air source and to vacuum from the engine manifold. This construction insures positive opening and closing of the poppet valve in the timed relation desired.

In the drawing:
FIGURE 1 is a schematic presentation of a system embodying the invention with a system being installed on a V-type engine;
FIGURE 2 is a partial section view taken in the direction of arrows 2—2 of FIGURE 1 with parts broken away and illustrating the details of the air introducing means;
FIGURE 3 is a longitudinal section view of the air distribution and timing valve which is used with the system of FIGURE 1; and
FIGURE 4 is a transverse section view taken in the direction of arrows 4—4 of FIGURE 3.

A system embodying the invention is schematically illustrated in FIGURE 1. The engine 10 may be of the V-8 type and includes banks 12 of cylinders 14 formed in the engine block 16. Suitable cylinder heads 18 may be provided to cooperate with the cylinders 14 and the reciprocating pistons contained therein to form combustion chambers 20. Spark plugs 22 may be provided for each combustion chamber and suitably energized to ignite the fuel air charges introduced into the cylinders. Air introducing mechanisms 24 may also be provided for each combustion chamber and one mechanism may connect with each combustion chamber through openings 26 provided for that purpose in cylinder heads 18. The engine crankshaft 28 may be suitably connected to an air compressor 30 to drive the compressor and provide compressed air to the tank 32 through conduit 34. Air compressor 30 must provide sufficient air quantities at sufficient pressures to satisfactorily operate the system. It has been found that the compressor should supply one-half to one cubic foot per minute of air per engine cylinder within a pressure range of 30 p.s.i. to 150 p.s.i. while the engine is operating at idle and low speed conditions in order to give the best results.

An air distribution and timing valve 36 may be driven by a driving member 38 which is in turn suitably connected to a portion of the engine 10 which rotates in timed relation to the engine. Drive member 38 is schematically illustrated as being connected to the driving mechanism for the engine distributor 40 so that the valve 36 will go through the complete cycle while the engine 10 operates throughout one complete cycle. Thus, in a four stroke-cycle engine the rotatable element of valve 36 will make one revolution while crankshaft 28 makes two revolutions.

Conduit 42 receives air from tank 32 and has conduit 44 connected therewith and leading to air distribution valve 36 to furnish compressed air to that valve. Conduit 46 is connected with tank outlet conduit 42 and conducts compressed air to the air supply manifold 48 which extends longitudinally along each engine bank 12. Manifold 48 is provided with conduits 50 which connect the manifold with the air introducing mechanism 24 in parallel.

The compressed air discharge ports of air distribution and timing valve 36 are connected with a series of conduits 52. Each conduit 52 is connected to one of the air introducing mechanisms 24 to supply timed air for actuating those mechanisms.

One of the air introducing mechanisms 24 is shown in detail in FIGURE 2. The mechanism includes an adapter 54 which is installed through opening 26 and seals against the outer surface of cylinder head 18. A valve body 56 is attached to adapter 54 by suitable means such as the threaded section 58. An air chamber 6 is formed transversely within valve body 56 and connects with an air supply passage 62 in which conduit 50 is received. Manifold 48 supplies compressed air to air chamber 60 through conduit 50 and passage 62 and maintains air under pressure in that chamber at all times while the system is operating.

A valve chamber 64 is provided in valve body 60 adjacent threaded section 58 and a valve seat 66 is formed on the web 68 separating valve chamber 64 and air chamber 60. Valve seat 66 is on the valve chamber side of web 68. A poppet valve 70 extends through valve passage 72 formed in web 66 and web 74 which forms a wall for air chamber 60 opposite web 68. A valve actuating chamber 76 is formed in valve body 56 on the opposite side of web 74 from air chamber 60. Chamber 76 has a suitable valve seal and guide 78 in the end thereof adjacent web 74 through which the stem 80 of valve 70 extends. A valve actuating piston 82 is received in the upper end of chamber 76 and is secured to the upper end 84 of valve 70. The side wall 86 of piston 82 is in engagement with cylinder wall 88. Wall 88 provides a piston guide and seal for piston 82 in chamber 76. A piston cap 90 is secured and sealed to the upper end of valve body 56 to define a piston actuating chamber 92 and also to provide suitable connecting means for connecting conduit 52 with the piston actuating chamber.

A valve closing spring 94 is mounted about valve stem 80 intermediate valve seal and guide 78 and piston 82 so as to urge valve 70 into the closed position. The lower portion of chamber 76 is vented to the atmosphere through port 96.

Valve 70 has its lower end formed to provide valve head 98 which is shaped to seat against valve seat 66. The valve stem portion 100 extending through air chamber 60 when the valve is closed is necked down so that the valve stem clears web 68 when the valve is opened and air can flow from air chamber 60 through web 68 and past valve seat 66 and valve head 98 into the valve chamber 64 and then through passage 102 in adapter 54 and into combustion chamber 20.

In the operation of the system, compressed air is maintained within the manifold 48 and in each of the air chambers 60 provided in each of the air introducing mechanisms 24. Air is, therefore, maintained at full pressure up to valve head 98 but is not permitted to pass beyond that point until the valve is opened. An air distribution and timing valve 36 is driven in timed relation with the engine and air under pressure is conducted through conduit 52 to actuating chamber 92 in mechanism 24. The air moved through conduit 52 is so timed that it will act on piston 82 to overcome the force of spring 94 and the combustion chamber gas pressures during the engine expansion stroke in the timed relation described in detail in my co-pending application referred to above. The introduction of air into the combustion chamber at this time will permit the otherwise unburned hydrocarbons contained in the combustion gases to more completely burn, resulting in substantial elimination of carbon monoxide in the exhaust gases as well as hexane and other unburned hydrocarbons. This additional burning will increase the expansion pressure in the engine. Engine efficiency is increased since the energy normally discarded in the form of unburned hydrocarbons in the exhaust system is utilized in the combustion chamber during the power stroke. When the air injection period is completed, air distribution and timing valve 36 closes the inlet end of conduit 52 and the pressure within actuating chamber 92 decreases sufficiently to permit spring 94 to close valve 70.

The air distribution and timing valve illustrated in FIGURES 3 and 4 overcomes a disadvantage of using the air distribution and timing valve disclosed and claimed in my co-pending application noted above in a two air system of the type illustrated in FIGURE 1. If valve 36 closes the inlet end of conduit 52 and tightly seals that end at the completion of the air injection period and no leak-by is permitted at piston 82, a column of air under pressure will be maintained in conduit 52 and actuating chamber 92 for a time such that valve 70 may not close with the exact timing desired. This timing is somewhat critical since a complete cycle takes place each two seconds when a four stroke-cycle eight cylinder engine is operated at 480 r.p.m., and in one-half second at 1920 engine r.p.m. To overcome this situation, the distribution and timing valve 104 of FIGURES 3 and 4 alternately communicates each conduit 52 with pressurized air and engine intake manifold vacuum to provide positive opening and closing of poppet valve 70.

Conduit 44 of the system shown in FIGURE 1 is connected to the end 106 of valve housing 108. A rotor 110 is rotatably mounted in housing 108 and driven by the driving member 38. Rotor 110 has a longitudinal recess 112 extending axially through one end thereof adjacent housing end 106. A rotor extension 114 may be provided on the end of rotor 110 opposite driving member 38. Extension 114 may extend into a recess formed in housing end 106 within boss 116 to locate the rotor and provide a bearing surface. Conduit 44 connects with the boss recess and the rotor longitudinal recess 112. A radially extending slot 118 is formed in rotor 110 from recess 112 to the rotor outer surface 120. Slot 118 may be of approximately the same length as recess 112, which extends through the rotor to a point adjacent the rotor driving end to which driving member 38 is attached.

Valve housing 108 has a plurality of equally spaced radially extending passages 122 formed therein, the number of passages being equal to the number of air induction mechanisms 24 being used. One conduit 52 is connected to each passage 122 so that compressed air may be conducted to each introducing mechanism 24. Passages 122 are illustrated as being located along a pitched line on valve housing 108 in order to facilitate the installation of fittings or other hardware which connect conduit 52 to the valve housing passages. It is for this reason that slot 118 and recess 112 are preferably formed through a substantial portion of the length of rotor 110. If desired, however, and space permits, passages 122 may be positioned in a circumferential plane. As the rotor rotates, slot 112 will successively communicate with each of the passages 122. These passages are so connected to mechanisms 24 that the mechanisms are actuated in timed relation with the stroke-cycle of each engine cylinder. Compressed air is maintained in recess 112 and slot 118 at all times. As the slot 118 connects with one of the passages 122, air under pressure is transmitted to the piston actuated chamber 92 in the associated introducing mechanism and the valve 70 is opened to admit air to the combustion chamber. The rotor 110 may rotate counter-clockwise as indicated by arrow 124 in FIGURE 4. When slot 118 breaks communication with passage 122, a compressed air column is maintained in conduit 52 and valve 70 continues to be held in the open position by the force exerted by this column of air. In order to accomplish this, rotor 110 must fit closely within housing 108 to minimize air leaks while permitting the rotor to rotate.

A key-way type slot 126 is formed in the outer surface of rotor 110 in a longitudinal direction and parallel to the rotor axis. When the valve is to be used with a four stroke-cycle engine, key-way slot 126 is positioned circumferentially beyond slot 118 an amount equal to one-half the desired crank angle during which air is to be injected into the combustion chamber. Thus, the angle formed at the axis of recess 112 between the centers of slots 118 and 126, as viewed in FIGURE 4, would be 50° if the air injection period is to take place through 100° of engine crank angle.

Valve housing 108 has an annular recess 128 formed around boss 116 and separated and sealed from the pressurized air inlet 130 which is formed centrally of the boss. A vacuum conduit 132 is connected with recess 128 through housing passage 134 and is connected to a suitable vacuum source such as the engine intake manifold 136. When the engine and system is operating, a vacuum is therefore maintained in recess 128 and slot 126. After air from slot 118 has pressurized a valve actuating chamber 92 and its associated conduit 52 through a passage 122, slot 126 moves into communication with that passage 122. The time will be 50 rotor degrees later, or 100 crank angle degrees later, if that air injection timing is being used. When the positive air pressure acting against valve piston 82 is relieved, spring 94 immediately acts to close the valve and cut off the supply of compressed air to the combustion chamber 20 from the air supply manifold 28. This system provides positive opening and closing action of the valve 70 in exact timed relation with the engine.

I claim:

1. A compressed air distribution and timing system for delivering compressed air to a combustion chamber of an internal combustion engine in timed operation with a cycle of operation carried out within said combustion chamber, said system comprising air injector means having a compressed air chamber formed therein and valve means for opening and closing said air chamber to communication with said combustion chamber, valve actuating means including a valve actuating piston chamber formed in said air injector means and valve actuating piston means received therein and secured to said valve, first conduit means including a compressed air manifold connected with said compressed air chamber in the air injector means for maintaining compressed air in said air chamber, second conduit means for connecting said valve actuating piston chamber alternately with a source of compressed air and a source of vacuum in that order so that said valve means is positively opened and closed in timed fashion by pressure differentials acting on said valve piston means, and engine driven rotary timing and distribution means connected in said second conduit means between said air injector means and a compressed air source and a vacuum source for controlling the admission of compressed air and vacuum to said second conduit means in timed relation with the cycle within said combustion chamber.

2. A compressed air distribution and timing system according to claim 1 wherein said rotary timing and distribution means comprises, a housing, a rotor rotatably received in the housing, a plurality of openings spaced circumferentially about the housing and extending therethrough to communicate with said rotor having a first passage means formed therein adapted to be connected with a compressed air source and to successively communicate with each of said openings to deliver compressed air through the second conduit means to said valve actuating piston chamber, and a second passage means formed in the rotor and adapted to be connected to a vacuum source and to successively communicate with each of said openings to evacuate the second conduit means, and said valve actuating piston chamber, said first and second passage means being spaced apart at the surface of the rotor a predetermined angle relative to a cycle of operation carried out within said combustion chamber.

3. A compressed air distribution and timing system for delivering compressed air to the combustion chambers of an internal combustion engine in timed operation with a cycle of operation carried out within the combustion chambers and comprising, an air compressor driven by the engine to provide a source of air pressure for the system, a rotary distribution valve driven in timed relationship by the engine, air injector means opening into the interior of each combustion chamber and including air operated valve means for controlling the opening and closing of the air injector means, pressure conduit means connected to the air compressor and including a first branch circuit having an air manifold connected in parallel with each air injector means and a second branch circuit connected with the rotary distribution valve, vacuum conduit means adapted to communicate with a vacuum source and connected with the rotary distribution valve, and air operated valve conduit means connected between the rotary distribution valve and each air injector means for alternately delivering pressure and vacuum to operate said air operated valve means, said rotary distribution valve being operable to alternately connect said air compressor and vacuum source sequentially to said air operated valve conduit means to operate said air operated valve means in timed order according to the timing of the engine.

References Cited in the file of this patent
UNITED STATES PATENTS

| | | |
|---|---|---|
| 885,459 | Engler | Apr. 21, 1908 |
| 2,383,349 | Slick | Aug. 21, 1945 |
| 2,447,423 | Nies | Aug. 17, 1948 |
| 2,598,754 | Booth | June 3, 1952 |
| 2,616,997 | Favre | Nov. 4, 1952 |
| 2,818,881 | Bonner | Jan. 7, 1958 |